United States Patent
Barney

(10) Patent No.: US 10,679,112 B2
(45) Date of Patent: Jun. 9, 2020

(54) ROTARY RFID SWITCH

(71) Applicant: STANLEY INDUSTRIAL AND AUTOMOTIVE, LLC., Westerville, OH (US)

(72) Inventor: Clifford S. Barney, Acworth, GA (US)

(73) Assignee: STANLEY INDUSTRIAL AND AUTOMOTIVE, LLC., Westerville, OH (US)

( * ) Notice: Subject to any disclaimer, the term of this patent is extended or adjusted under 35 U.S.C. 154(b) by 33 days.

(21) Appl. No.: 15/748,753

(22) PCT Filed: Jul. 29, 2016

(86) PCT No.: PCT/US2016/044662
§ 371 (c)(1),
(2) Date: Jan. 30, 2018

(87) PCT Pub. No.: WO2017/023735
PCT Pub. Date: Feb. 9, 2017

(65) Prior Publication Data
US 2019/0026620 A1    Jan. 24, 2019

Related U.S. Application Data

(60) Provisional application No. 62/199,962, filed on Jul. 31, 2015.

(51) Int. Cl.
*G06K 19/06*    (2006.01)
*G06K 19/073*    (2006.01)
(Continued)

(52) U.S. Cl.
CPC ... *G06K 19/07345* (2013.01); *G06K 7/10366* (2013.01); *G06K 19/0723* (2013.01);
(Continued)

(58) Field of Classification Search
CPC ......... G06K 19/0723; G06K 19/07345; G06K 19/07701; G06K 19/07703;
(Continued)

(56) References Cited

U.S. PATENT DOCUMENTS 6,008,727 A    12/1999    Want et al.
9,911,020 B1 *    3/2018    Liu .......................... G01S 13/74
(Continued)

FOREIGN PATENT DOCUMENTS

DE    102008039377 A1    2/2010
DE    102013223505 B3    11/2014

OTHER PUBLICATIONS

Canadian Application No. 2,994,238, Examination Report dated Dec. 7, 2018.
(Continued)

*Primary Examiner* — Thien M Le
(74) *Attorney, Agent, or Firm* — Thomas Horstemeyer, LLP

(57) ABSTRACT

Various methods and apparatus embodiments involving RFID are disclosed. One method embodiment, among others, includes receiving an excitation signal at a rotary switch associated with a plurality of radio frequency identification (RFID) tags and a radio frequency (RF) masking material, and orienting the RF masking material with respect to all RFID tags such that a RFID tag is rendered detectable by a nearby RFID reader.

17 Claims, 7 Drawing Sheets

(51) Int. Cl.
*H04Q 5/22* (2006.01)
*G06K 19/07* (2006.01)
*G06K 7/10* (2006.01)
*G06K 19/077* (2006.01)
*H01Q 1/22* (2006.01)

(52) U.S. Cl.
CPC . *G06K 19/07701* (2013.01); *G06K 19/07745* (2013.01); *G06K 19/07775* (2013.01); *H01Q 1/2225* (2013.01); *H04Q 5/22* (2013.01); *G06K 7/10445* (2013.01); *G06K 19/07703* (2013.01); *H04Q 2213/13095* (2013.01); *H04Q 2213/13175* (2013.01)

(58) Field of Classification Search
CPC ....... G06K 19/07745; G06K 19/07775; G06K 7/10366; G06K 7/10445; H01Q 1/2225; H04Q 2213/13095; H04Q 2213/13175; H04Q 5/22
See application file for complete search history.

(56) References Cited

U.S. PATENT DOCUMENTS

| | | |
|---|---|---|
| 2003/0016136 A1 | 1/2003 | Harvey |
| 2007/0115127 A1 | 5/2007 | Harper et al. |
| 2010/0026493 A1* | 2/2010 | Rinkes ................. G06Q 10/087 340/572.1 |
| 2010/0079289 A1 | 4/2010 | Brandt et al. |
| 2010/0315922 A1 | 12/2010 | Maetz et al. |
| 2011/0040233 A1 | 2/2011 | Kassem |
| 2011/0068925 A1* | 3/2011 | Burnside ............... G06K 7/0008 340/572.7 |
| 2011/0199189 A1* | 8/2011 | Eluard ............... G06K 19/0723 340/10.5 |
| 2013/0154804 A1* | 6/2013 | Jung .................. G06K 7/10356 340/10.1 |
| 2014/0124493 A1* | 5/2014 | Enyedy ............ G06K 19/07309 219/137 PS |
| 2014/0374492 A1 | 12/2014 | Mullis et al. |
| 2017/0206385 A1* | 7/2017 | Barney ............... G06K 7/10366 |
| 2017/0324133 A1* | 11/2017 | Grassl ............... H01H 1/2041 |

OTHER PUBLICATIONS

European Application No. 16833597.4, Search Report dated Feb. 20, 2019.

International Search Report for PCT/US2016/044662 dated Oct. 7, 2016.

Canadian Application No. 2,994,238, Examination Report dated Nov. 29, 2019.

* cited by examiner

|  | | Mode Selector | |
| --- | --- | --- | --- |
|  | | A | B |
| Knob Rotational Position | 1 | Restock | Hold |
| | 2 | Repack | Fail |
| | 3 | Ready | Test |
| | 4 | Ship | Inspect |
| | 5 | Pack | Repair |
| | 6 | QA | Calib. |
| | 7 | Stock | Out |
| | 8 | Audit | Ok |

FIG. 8

ROTARY RFID SWITCH

CROSS REFERENCE TO RELATED APPLICATION

This application is the 35 U.S.C. § 371 national stage application of PCT Application No. PCT/US2016/044662, filed Jul. 29, 2016, where the PCT claims the benefit of, and priority to, U.S. Provisional Patent Application No. 62/199,962, entitled "ROTARY RFID SWITCH" filed on Jul. 31, 2015, both of which are herein incorporated by reference in their entireties.

TECHNICAL FIELD

The present disclosure is generally related to monitoring and controlling objects, and more particularly, to systems, devices, and methods for remotely monitoring and controlling objects using radio frequency identification (RFID) technology.

BACKGROUND

RFID tags are widely used throughout industry to track assets and monitor industrial processes. Typically this involves physically associating an RFID tag with an object and modeling that association in an information storage and retrieval system (ISRS) such as a database. RFID readers and antennas strategically located throughout a workspace continuously interrogate nearby RFID tags, sending information about detected tags to said ISRS. Certain components of said ISRS use collected RFID data to populate a computer user interface with information about RFID-tagged objects.

Depending upon the design of an RFID tracking system, the presence or absence of an RFID-tagged object within the read range of specific antennas can be determined, from which an approximate location and movement history can be derived.

Oftentimes, however, more detailed information about an RFID-tagged object's status must be made known to the ISRS to facilitate optimal decision-making. For example, an RFID-tagged object may need additional inspection, or may be missing a part, or may require special handling, etc. Conventional RFID tags simply respond to interrogations within their designed frequency ranges. Although it is possible to write limited user-defined data to certain types of RFID tags, many users engage read/write-lock controls for security purposes. Furthermore, writing user-defined data to an RFID tag requires the use of an RFID reader and specialized training. Directly writing to an RFID tag as a means of conveying the status of an RFID-tracked object is not practical for the rapid pace of a workplace.

SUMMARY

Embodiments of the present disclosure are related to a rotary switch used to switch among multiple RFID tags.

According to one embodiment, among others, a method is provided comprising the steps of sending an excitation signal to a rotary switch associated with a plurality of radio frequency identification (RFID) tags and a radio frequency (RF) masking material and orienting the RF masking material with respect to all RFID tags such that only a single tag is rendered detectable by a nearby RFID reader.

Another method embodiment, among others, includes sending an excitation signal to a rotary switch associated with a plurality of radio frequency identification (RFID) tags and a plurality of radio frequency (RF) masking materials and orienting the RF masking materials with respect to RFID tags such that a plurality of RFID tags (but not all) are rendered detectable by a nearby RFID reader, the possible unique combinations of said detectable tags surpassing the number of RFID tags.

One apparatus embodiment, among others, comprises a first member comprising an RF masking material employing a cut-through by which only a single RFID tag can be detected, a second member in rotational relationship to the first member and a multitude of RFID tags coupled to the second member such that a single RFID tag can be selected to be detectable, while all other RFID tags are rendered undetectable.

One apparatus embodiment, among others, comprises a first member comprising a non-flat RF masking material, a second member in rotational relationship to the first member and a multitude of RFID tags coupled to the second member, the contours of a portion of both members comprising a cam such that the spacing between the first and second members is momentarily increased when the first and second members rotate with respect to one another, thus preventing abrasion of said members with each other, and allowing the RF masking material to rotate over and above non-flat RFID tags.

Other systems, devices, methods, features, and advantages of the present disclosure will be or become apparent to one with skill in the art upon examination of the following drawings and detailed description. It is intended that all such additional systems, methods, features, and advantages be included within this description, within the scope of the present disclosure, and protected by the accompanying claims.

In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood by referencing the following drawings. The components in each drawing are not necessarily to scale, emphasis instead being placed upon clearly illustrating the principles of the disclosure. Moreover, like reference numerals designate corresponding parts through the several views.

FIG. 8 is table depicting one the selectable positions of one embodiment of a rotary RFID switch equipped with a mode selector according to various embodiments of the present disclosure.

DETAILED DESCRIPTION

Figure 1:
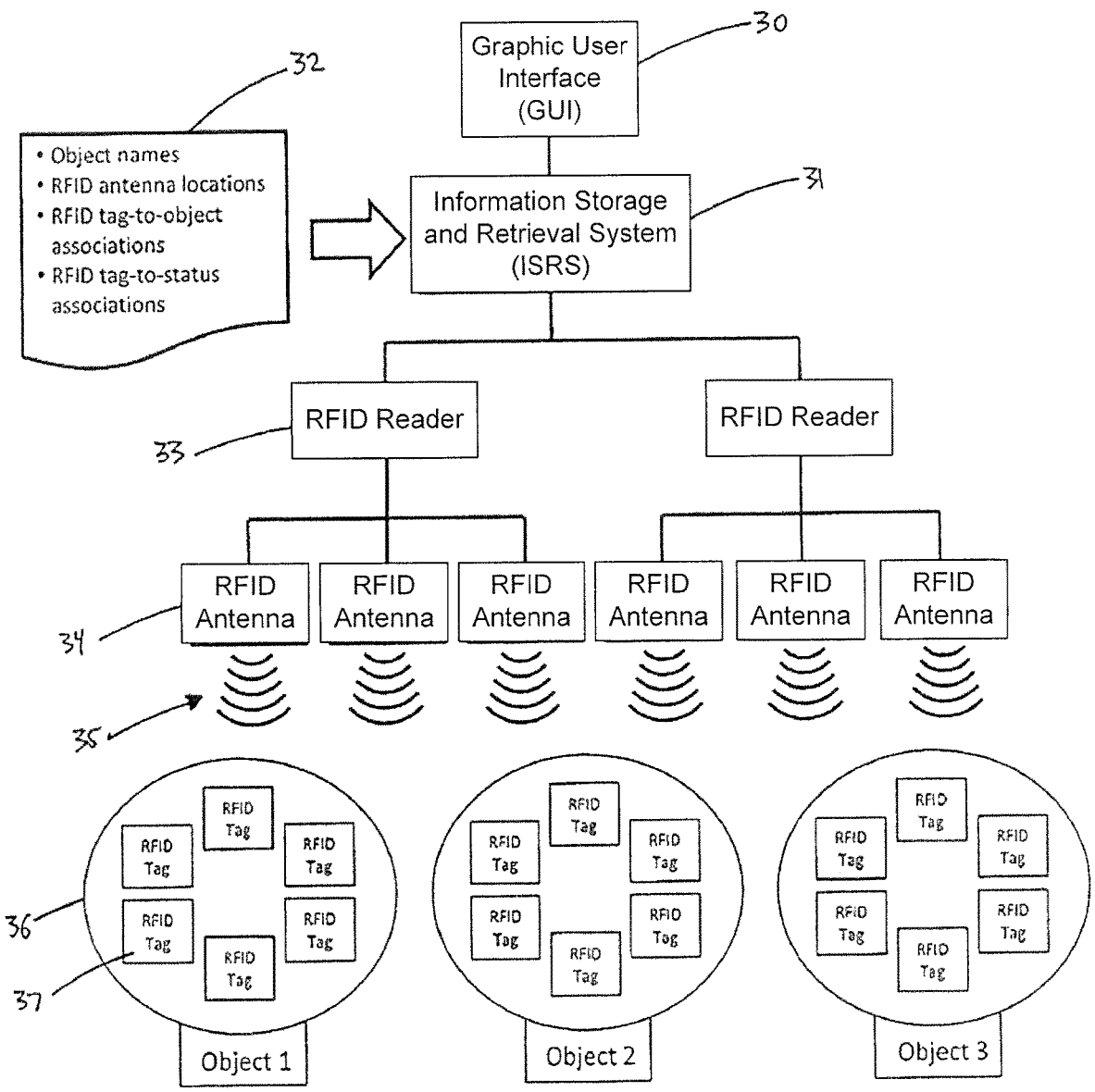
FIG. 1 is a system diagram depicting one embodiment of an RFID object status tracking system according to various embodiments of the present disclosure.

Disclosed herein are various embodiments of systems, devices, and methods by which status about an RFID-tagged object can be conveyed using radio frequency identification (RFID) technology. Such systems, methods, and devices are herein referred to generally as object status tracking systems.

A summary of various terms used herein is provided below, followed by a brief overview of one or more embodiments of an object status tracking system and subsequently a more detailed description of these and other embodiments. RFID refers to technology that uses radio waves to automatically identify people or objects. An object refers to any item used in a facility, work environment, or the like, the presence of which is required to perform work functions such as assembly, processing, design, testing, cleaning, organizing, etc. Examples of objects include hand tools, material handling equipment, parts to be assembled, finished goods, safety equipment, reels of cable, calibration equipment, etc.

A RFID system can comprise three principal components: 1) an RFID reader, 2) an RFID antenna, and 3) an RFID tag. An RFID reader can be a radio transceiver that transmits and receives specifically formatted messages within a certain frequency range. It can alternate between 'transmit' mode and 'receive' mode. An RFID antenna can be electrically coupled to the RFID reader and can alternate between transmitting and receiving radio communications. An RFID tag can be a solid-state electronic device comprising a microprocessor and a radio antenna. There are three main types of RFID tags: passive, active, and semi-active. Passive RFID tags can contain no power source, and they are powered by radio waves from the RFID reader. Active tags can contain an internal power source such as a battery for microprocessor and transmit functions. Semi-active tags can use an internal power source to only run the microprocessor. Passive and semi-active tags do not technically transmit responses back to an RFID reader. Rather, they backscatter the incoming radio signal in such a way that the RFID reader is able to uniquely identify a particular tag.

RFID technology can be used to track objects by directly affixing an RFID tag to each object, and then modeling that association in an information storage and retrieval system (ISRS), e.g. a database. In a typical RFID-based object tracking system, given a sufficient number of RFID antennas connected to strategically placed RFID readers, two channels of data can be extracted: 1) the presence or absence of an object, and 2) the approximate location of an object. RFID tags can be manufactured in a variety of form factors to suit different purposes. For the purposes of the present disclosure, two RFID tag form factors are discussed: 1) inlay RFID tags and 2) encapsulated RFID tags. An inlay RFID tag can be a simple form factor comprising an RFID chip and a metallic foil antenna affixed to a thin, flexible substrate such as paper, often printed as adhesive labels. Inlay RFID tags can be used to track documents and shelved inventory because of their low cost. An inlay RFID tag is typically thin, with a thickness of around 0.1 millimeter. However, inlay RFID tags are not suitable for harsh environments because they are easily damaged by abrasion, liquids, bending, and extremes of temperature and humidity. For harsh environments, encapsulated RFID tags can be used. In this form factor, the chip and antenna can be protected within a hardened enclosure, often plastic or ceramic, which protects the tag from damage. This form factor can allow for non-flat antenna shapes, which can enhance readability and detection range. An encapsulated RFID tag is generally thicker, with a thickness greater than 1 millimeter. A non-limiting example of a shape for encapsulated RFID tags is a rectangular prism.

Certain materials can block the propagation of radio signals to an RFID tag, rendering them undetectable. Such materials are termed radio frequency (RF) masking materials. Most metals are RF masking materials, as are many liquids. Certain metamaterials, such as carbon impregnated plastic, can also act as RF masking materials. RF masking materials are also available as paints, powders, textiles, and foils. Many materials are transparent to radio waves, or nearly so, and are termed RF transparent materials. Many plastics, ceramics, and textiles are RF transparent materials. By associating more than one RFID tag with an RFID-tagged object, selective masking and unmasking of said RFID tags can provide useful functionality for conveying the status of said object. Typically, when associated with an object, the RFID tag can function as a presence/absence indicator, from which knowledge can be derived about whether the object is within the workspace, and its approximate location. A second RFID tag can also be associated with an RFID-tagged object to provide status indications in a true/false manner, examples including: 1) object needs inspection, 2) object is ready to ship, 3) object needs repair, 4) object needs calibration, 5) object is damaged, and other suitable status indicators.

Having described various terms used herein, a brief overview of one or more embodiments of an object tracking system is provided below. Certain embodiments of the object tracking system comprise an information storage and retrieval system (ISRS) that communicates data with one or more RFID readers, one or more RFID antennas that are hard-wired to RFID readers, and one or more objects that have RFID tags physically affixed to them. The ISRS can be programmed with three sets of data: 1) the names of objects, 2) the unique codes of RFID tags attached to those objects, and 3) the locations of RFID readers and antennas. When operating, the RFID readers can continuously transmit/receive and detect any RFID tags that are within a predefined distance from one of the RFID readers. Each RFID tag can respond with a unique code that is already known to the ISRS. The RFID reader and ISRS can be in frequent communication with one another, thus, when the RFID reader detects an RFID tag, the ISRS is able to associate that RFID tag to a specific object. A typical RFID system can also communicate unique codes related to each RFID reader and RFID antenna, thus, the ISRS can determine which reader and which antenna detected the RFID tag. Assuming that the locations of readers and antennas have been previously mapped, from this data, the ISRS can derive the approximate location of the RFID-tagged object.

Having described generally the underlying functionality and architecture of certain embodiments of an object tracking system, one object status tracking system embodiment, among others, can be generally described as follows. An ISRS can be programmed with certain information about objects to be tracked via RFID. It can associate multiple RFID tags with each object, and each RFID tag can be associated with a particular state such as 'needs repair', 'ready to ship', 'out for calibration,' or other suitable condition states. A rotary RFID switch comprising a plurality of RFID tags can be affixed to an object. Each tag can be uniquely selectable using a rotating knob. Each of the tags within the switch can respond with a unique code which is programmed into the ISRS. The switch can be configured such that only a single RFID tag is detectable at any time, the remainder being rendered undetectable by use of rotating RF masking material. A plurality of RFID readers, each connected to a plurality of RFID antennas, can be in continuous operation, alternately transmitting and receiving signals to/from RFID tags. Each detectable tag can respond with a unique code, which is captured by an RFID reader. The RFID readers can be in frequent communication with the ISRS, which can interpret each tag's code and associate it to both an object and a status. It then can interpret the RFID reader and RFID antenna associated with the response and determine the object's approximate location.

Assume that a user needs to change the status of an RFID-tagged object from, for example, 'Hold', to 'Ready'. He or she can rotate the knob on the rotary RFID switch from 'Hold' to 'Ready'. The RFID tag associated with 'Hold' can cease to respond, while the RFID tag associated with 'Ready' suddenly can start responding. Nearby RFID readers can communicate this information to the ISRS, which interprets new response data as a change in the status of that object.

Having described generally one embodiment, among others, of an object status tracking system, what follows is a detailed description of an embodiment of an object status tracking system.

Referring to FIG. 1, shown is one embodiment of an object status tracking system that comprises an information storage and retrieval system (ISRS) 31, a plurality of RFID readers 33, and a plurality of RFID antennas 34. The RFID antennas 34 can detect a plurality of RFID-tagged objects 36 within a detection range of the RFID antennas 34. Each RFID-tagged object 36 can be affixed with a plurality of RFID tags 37. In some embodiments, the RFID-tagged object 36 can configured such that only a single tag is rendered detectable at any time. In some embodiments, among others, the RFID-tagged object 36 can be a storage bin, a tool, a tooling station, or other suitable objects having various states.

The ISRS 31 can be programmed with data 32 comprising 1) object names, 2) the location of each RFID antenna, 3) the association of each RFID tag to a single object, and 4) the association of each RFID tag to a single state. A state can represent some descriptor of an object's status, for example, 'Ready', 'Needs Repair', or other suitable descriptors. In a preferred embodiment, each object or type of object can have a differentiated set of possible states. For example, the possible states of a forklift are plausibly different than the possible states of a container of shirts.

In a preferred embodiment, the plurality of RFID tags 37 affixed to an object 36 can be contained within a rotary RFID switch such that a user can easily select a single RFID tag to be detectable by nearby RFID readers 33.

In normal operation, the user can change the status of an RFID-tagged object 36 by changing the position of the rotary RFID switch. This action can isolate a single RFID tag 37 affixed to the object to be detectable by a nearby RFID reader 33, rendering all other RFID tags 37 affixed to the object 36 to be undetectable. The RFID antennas 34 can transmit excitation signals 35 that energize the RFID tag 37, triggering its unique code to be acquired by the RFID reader 33 associated with that RFID antenna 34. The RFID reader 33 can communicate the detected RFID tag data to the ISRS 31. The ISRS 31 can compare the RFID tag data with its own programmed set of data 32, thereby associating the RFID tag 37 to both an object 36 and a status. The ISRS 31 can further interpret certain data about the RFID reader 33 and RFID antenna 34 that detected the RFID tag 37, thereby inferring the approximate location of the object 36. For example, upon identifying the RFID antenna 34 and the RFID Reader 33 associated with the detected RFID tag 37, the ISRS 31 can determine and/or retrieve data associated with the location the RFID antenna 34 or the RFID Reader 33. With this information, the ISRS 31 can approximate the location of the RFID tag 37. In addition, in some embodiments, the ISRS 31 can obtained signal strength data from the RFID reader 33 when detecting the RFID tag 37. The signal strength can be used to further calculated a location of the RFID tag 37. This information is further refined as necessary and displayed to the user via a graphical user interface (GUI) 30.

Figure 2A:
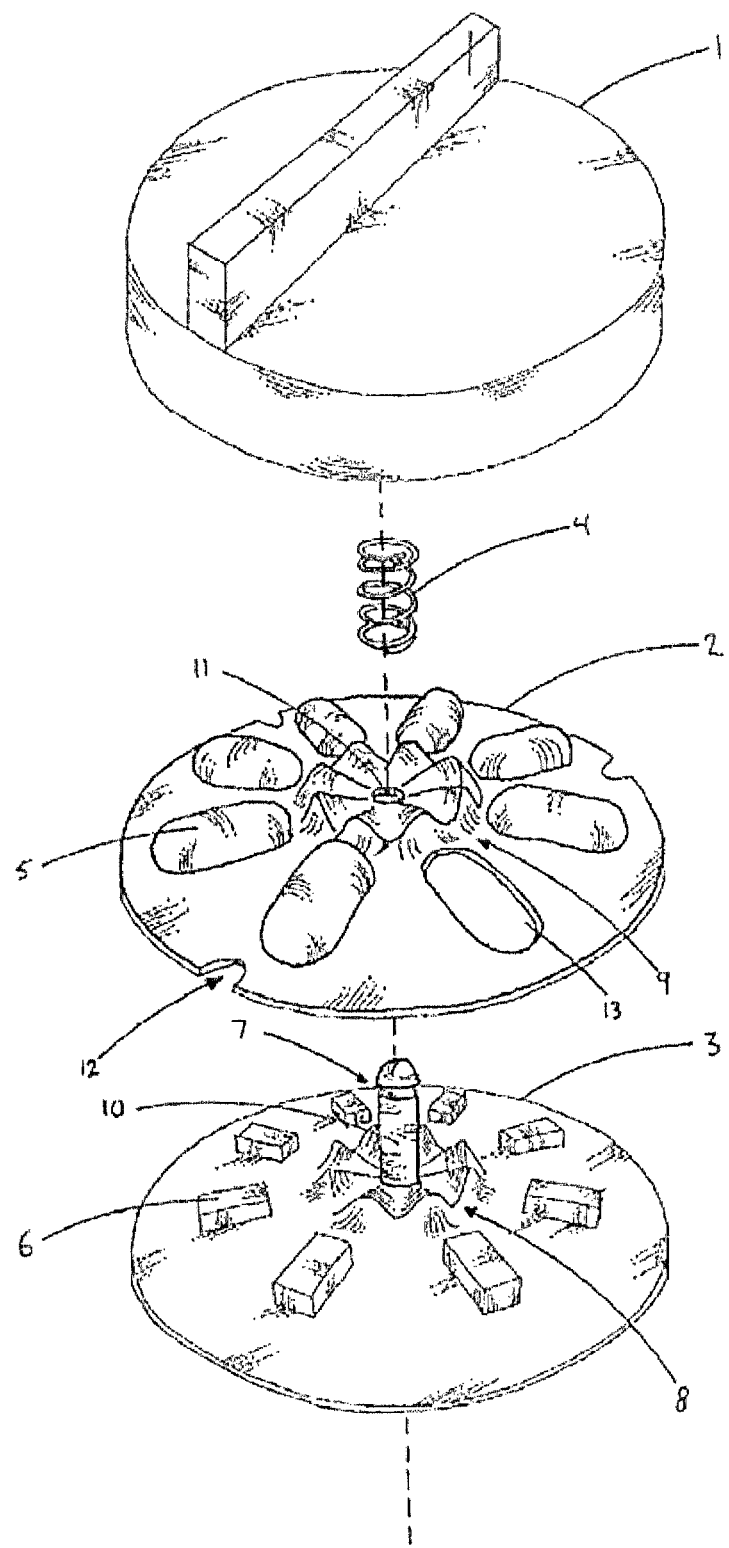
FIG. 2A is an exploded isometric view of a rotary RFID switch according to various embodiments of the present disclosure.

Having described various method embodiments, what follows is a detailed description of several embodiments, among others, of a rotary RFID switch. Referring to FIG. 2A, shown is one embodiment of a rotary RFID switch that comprises a switch base 3, RF masking plate 2, compression spring 4, and selector knob 1. In a preferred embodiment, among others, the switch base 3 is circular and stamped from sheet metal in order to facilitate the proper operation of metal-mount RFID tags.

Mounted radially around the geometric centerpoint of the switch base 3 are a plurality of identical RFID tags 6 with dimensions best described as rectangular prisms, as one non-limiting example. In the illustrated embodiment, among others, each of the RFID tags 6 are mounted equidistant from the geometric centerpoint of the switch base 3 and are equidistant from one another such that the angular distance between adjacent RFID tags 6 is identical.

The switch base 3 can comprise a first plurality of raised indentions 8, which can be stamped, molded, or otherwise formed into the switch base 3. The raised indentions 8 can circumscribe the switch base 3 and correspond to the number of RFID tags 6. Collectively, the arrangement of the raised indentations 8 are henceforth referred to as the 'lower cam'. Each of the raised indentations 8 can be positioned equidistant from the geometric centerpoint of the switch base 3 and is equidistant from adjacent raised indentations 8 such that the angular distance between adjacent raised indentations 8 is identical. The angular position of each raised indentation 8 can correspond identically to the angular position of each RFID tag 6 such that a line can be drawn from the geometric centerpoint of the switch base 3 to its outer rim such that the line bisects an RFID tag 6 and an raised indentation 8. The height of each raised indentation 8 can be greater than the height of each RFID tag 6. The purpose of the raised indentations 8 can be to guide the vertical movement of the RF masking plate 2 over and above the RFID tags 6 as it is being rotated about the center from one position to the next.

In the illustrated embodiment, a fixed cylindrical hub 10 can extend perpendicularly from the geometric center of the switch base 3. A RF masking plate 2, a spring 4, and a selector knob 1 can be mounted, respectively, on the fixed cylindrical hub 10 and permitted to rotate. A notch 7 can be inscribed radially just below the tip of hub 10 by which means the selector knob 1 can be snapped onto the hub 10, yet easily removed for switch configuration.

The RF masking plate 2 can comprise a rigid material that serves to mask all but one of the RFID tags 6 on the switch base from being detected by nearby RFID readers. In a preferred embodiment, the RF masking plate 2 can be stamped from sheet metal.

The RF masking plate 2 can comprise a plurality of tag covers 5, which can be stamped, molded, or otherwise formed into the RF masking plate 2 and circumscribing the geometric centerpoint of the RF masking plate 2. The tag covers 5 can be configured as raised indentations from the RF masking plate 2. Each of the tag covers 5 can be positioned equidistant from the geometric centerpoint of the RF masking plate 2 and can be equidistant from adjacent tag covers 5 such that the angular distance between adjacent tag covers 5 is identical. The dimensions of the tag covers 5 can be configured such that when the RF masking plate 2 is lowered onto the hub 10 and rotated to a certain angular orientation and allowed to drop, the surfaces of the RF masking plate 2 and switch base 3 are flush against one another (henceforth termed the 'set position') and the tag covers 5 envelope all but one RFID tags 6. If the number of RFID tags 6 mounted to the switch base 3 is A, then the number of tag covers 5 stamped into the RF masking plate 2 can be (A−1).

In the illustrated embodiment, an RF window 13 can be formed by removing material in a certain shape from the RF masking plate 2. The dimensions of the RF window can approximate the maximum dimensions of a tag cover 5 where it meets the surface of the RF masking plate 2. The RF window 13 can be positioned such that it is equidistant to adjacent tag covers. When the RF masking plate 2 is in the set position, the RF window 13 can completely expose a single RFID tag, allowing it to be detected by nearby RFID readers.

The masking plate 2 can comprise a second plurality of raised indentations 9, which can be stamped, molded, or otherwise formed into the masking plate 2 and circumscribe its geometric centerpoint. The raised indentations 9 can correspond to the number of RFID tags 6. Collectively, the arrangement of indentations 9 are henceforth referred to as the 'upper cam'. Each of the identically-shaped indentations 9 can be positioned equidistant from the geometric centerpoint of the RF masking plate 2 and can be equidistant from adjacent indentations 9 such that the angular distance between adjacent indentations 9 is identical. The angular position of each indentation 9 can correspond identically to the angular position of each tag cover 6 or RF window 13 such that a line can be drawn from the geometric centerpoint of the RF masking plate 2 to its outer rim such that the line bisects an indentation 9 and tag cover 5 or RF window 13. The shape of any raised indentation 9 of the upper cam can be such that any raised indentation 8 of the lower cam fits precisely into it from below, allowing the flat surfaces of the RF masking plate 2 and the flat surfaces of the switch base 3 to precisely meet. The height of each raised indentation 9 can be greater than the height of each RFID tag 6. The purpose of the raised indentations 9 can be to guide the vertical movement of the RF masking plate 2 over and above the RFID tags 6 as it is being rotated from one position to the next.

The RF masking plate 2 can comprise a circular hole 11 of a diameter equal to that of the hub 10. The circular hole 11 can be cut through the geometric center of the RF masking plate 2 so that it can be mounted onto the hub 10 and allowed to rotate.

Figure 2B:
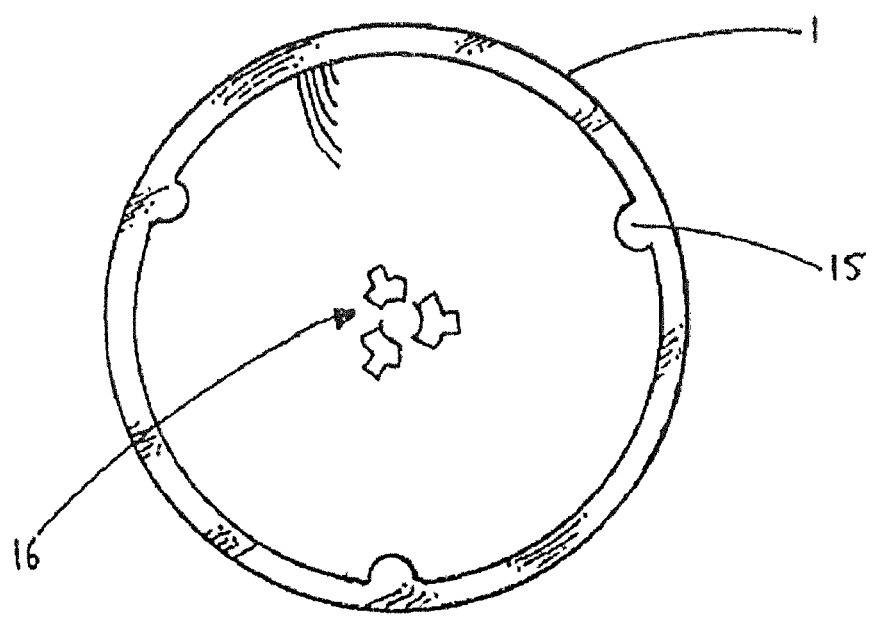
FIG. 2B is an underside view of a rotary RFID switch selector knob according to various embodiments of the present disclosure.

Referring to FIG. 2B, shown is the underside of the selector knob 1. At the geometric centerpoint, the selector knob 1 can comprise a minutely expandable annular recess 16 into which the tip of hub 10 can be pressed until notch 7 snaps into place, securing the selector knob to the hub 10. A plurality of protrusions 15 around the bottom interior outside wall of the selector knob 1 can engage an corresponding plurality of notches 12 positioned along the outside rim of the RF masking plate 2 such that selector knob 1 and RF masking plate 2 move together when rotated. The RF masking plate 2 can move vertically up and down along the protrusions 15, guided by the rotational interaction of the lower cam and upper cam, comprised respectively of indentations 8 and 9. In a preferred embodiment, among others, to prevent the protrusions 15 from catching on the relatively thin RF masking plate 2, the notches 12 cut into the RF masking plate 2 can be fitted with sleeve bearings to promote smooth up-and-down movement.

Figure 3:
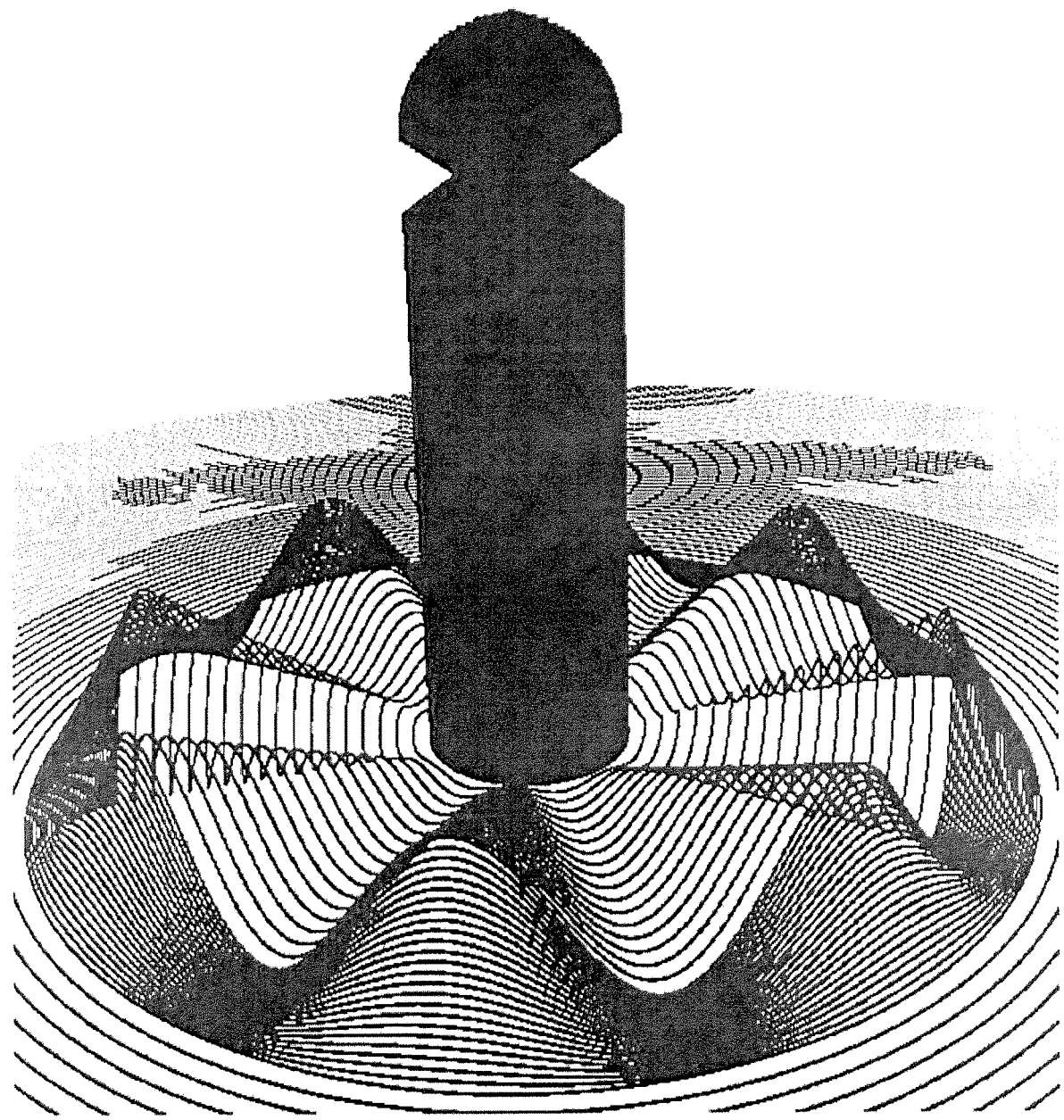
FIG. 3 is a close-up detail of a cam of a rotary RFID switch according to various embodiments of the present disclosure.

FIG. 3 shows a close-up of the lower cam on the switch base 3. In a preferred embodiment, the contours of the cam can be stamped, molded, or otherwise formed into the material of the switch base 3. The purpose of the lower cam can be to interact with the upper cam on the RF masking plate 2, particularly lifting the RF masking plate 2 over the RFID tags 6 as the selector knob 1 is being rotated. Assuming that the lower cam has some radius R, at each distance between the hub 10 and the radius R, the contours of the lower cam can be sinusoidal in which the minima coincides with the surface of the switch base 3, and the maxima is some distance above the surface of the switch base 3. With the upper cam having some radius R, at each distance between the hub 10 and the radius R, the contours of the upper cam can be sinusoidal in which the minima coincides with the surface of the masking plate 2, and the maxima is some distance above the surface of the masking plate 2.

The upper cam of the RF masking plate 2 and the lower cam of the switch base 3 can be designed to nest within one another, thereby allowing the flat surface of the RF masking plate 2 to meet with the flat surface of the switch base 3. In this way, the upward-facing tag covers 9 of the RF masking plate 2 can mate with the flat surface of the switch base 3, providing a tight RF seal around all but one of the RFID tags 6.

Figure 4:
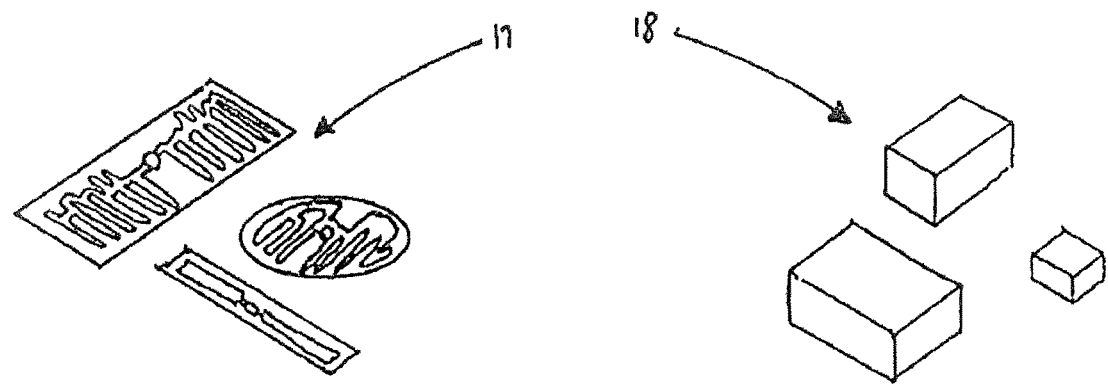
FIG. 4 is a comparison view between examples of two different RFID tag form factors: high-aspect ratio 'inlay' (left) and low-aspect ratio 'enclosure' (right) according to various embodiments of the present disclosure.

Referring to FIG. 4, shown is a comparison view between examples of two different RFID tag form factors: high-aspect ratio 'inlay' 17 (left) and low-aspect ratio 'enclosure' 18 (right).

Figure 5:
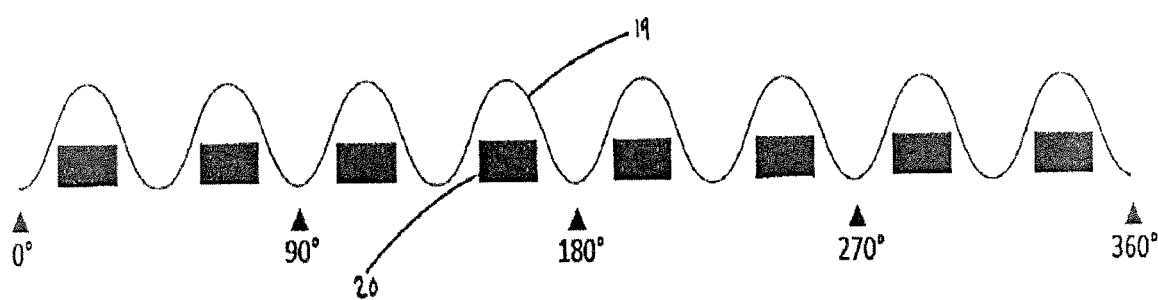
FIG. 5 is a linear representation of the circular movement of one embodiment of a rotating cam that momentarily lifts the RF masking material above the RFID tags such that abrasion is avoided according to various embodiments of the present disclosure.

FIG. 5 is a linear representation of the circular movement of the RF masking plate 2 through 360 degrees of rotation. Referring simultaneously to FIG. 1 and FIG. 5, a sinusoidal pattern 19 represents the height of the surface of the RF masking plate 2 above the surface of switch base 1 (including RFID tags 20) as it is rotated 360 degrees. The height of RF masking plate 2 above switch base 1 can be dictated by the interaction of the lower cam and upper cam as the selector knob 1 is rotated. The contours of the lower cam and upper cam, and the shape of the tag covers 5, can be such that at no point in the 360 degree rotation does any part of the RF masking plate 2 touch any RFID tag 20.

Selector knob 1 (FIG. 2) can be formed from an RF transparent material. In a preferred embodiment, selector knob 1 can be formed from molded plastic. The inner diameter of selector knob 1 can be slightly greater than the outer diameter of RF masking plate 2 such that RF masking plate 2 can fit inside selector knob 1. The height of selector knob 1 can be configured such that the vertical movement of RF masking plate 2 can be accommodated within the interior of selector knob 1.

Selector knob 1 and RF masking plate 2 can be free to rotate on hub 10. A compression spring 4 can extend along and surround the hub 10 between the selector knob 1 and the RF masking plate 2. The compression spring 4 can also maintain an extension force between the RF masking plate 2 and the selector knob 1. When the selector knob 1 is attached to the hub 10, the result can be a downward force pressing the RF masking plate 2 against the switch base 3.

In normal operation, the RF window 13 can expose only a single RFID tag 6 from the plurality of RFID tags to be readable to a nearby RFID reader. To change which RFID tag is readable, a user can rotate the selector knob 1 either clockwise or counterclockwise. When rotated, the lower cam and upper cam can engage one another, causing the RF masking plate 2 to lift upwards against spring 4 as it is simultaneously being rotated. As it moves rotationally and upwards, each tag cover 5 can clear the height of its current RFID tag, reaching a maximum height at the centerpoint between adjacent RFID tags. As the switch rotation forces the RF masking plate past its maximum height, it can begin to descend, aided by the spring 4, 'snapping' into place with each tag cover 5 completely enveloping an RFID tag, leaving one exposed for detection.

Figure 6:
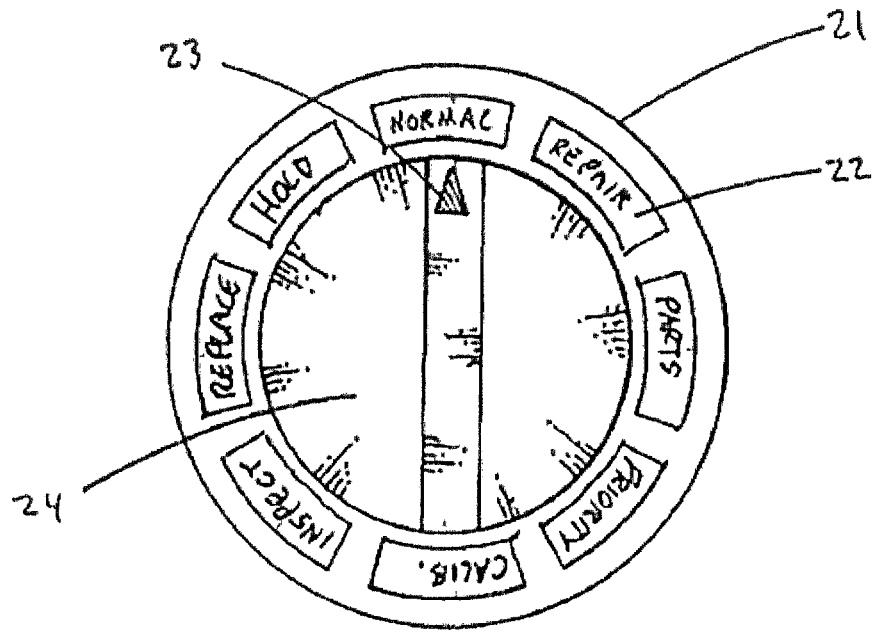
FIG. 6 is an overhead view of one embodiment of a rotary RFID switch used to convey status about an RFID-tagged object according to various embodiments of the present disclosure.

FIG. 6 shows one embodiment, among others, of a rotary RFID switch 21, as may be used to convey the status of an RFID-tracked object in a workplace. This embodiment, among others, is comprised of 8 RFID tags, hence 8 possible selections. At any time, a user can convey a status about the RFID-tagged object throughout the workplace by simply turning to one of the pre-selected choices on the switch label 22. A pointer 23 on the selector knob 24 can indicate the selection. A switch label 22 specific to the tracked object and/or the workplace can be custom printed for each rotary switch. To change the status of the RFID-tagged object, the user can simply turn the knob 24 clockwise or counterclockwise. This action can rotate the RF masking plate to the next position, masking all but a single RFID tag.

The number of RFID tags that can fit onto a rotary RFID switch can be limited by the desired size of the switch, and the size of the RFID tags used. In a preferred embodiment, owing to the impracticality of manufacturing different switches for different tag counts, a standard 8-tag switch can be used for an n-position switch (n<8) by installing limiters to prevent the selector knob 24 from being rotated beyond its intended range.

Figure 7:
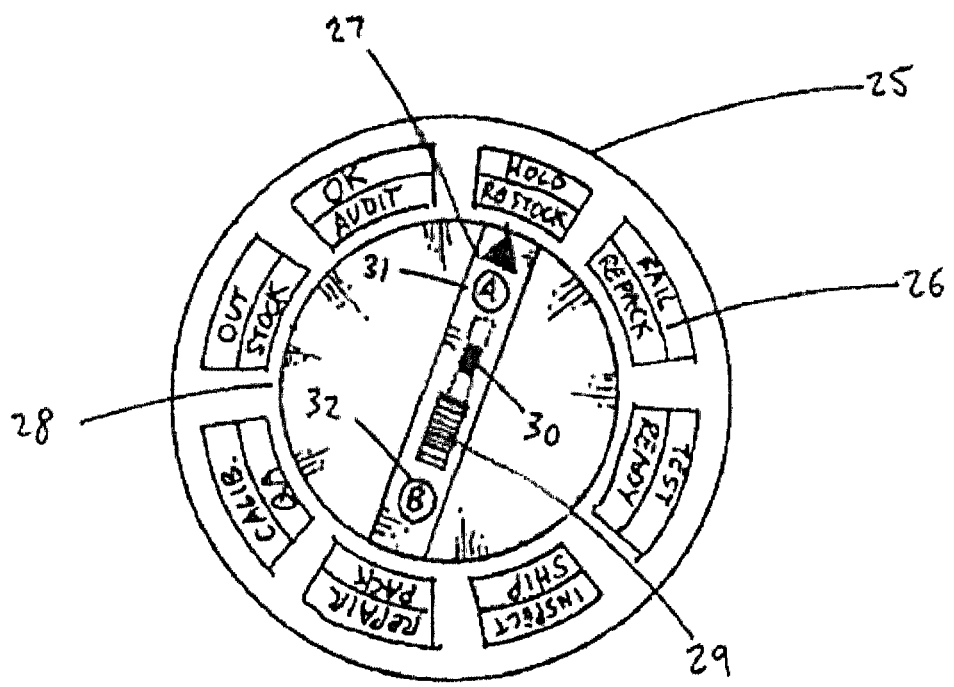
FIG. 7 is an overhead view of one embodiment of a rotary RFID switch used to convey status about an RFID-tagged object according to various embodiments of the present disclosure.

FIG. 7 shows an embodiment of a rotary RFID switch 25 that includes a 'mode selector' 29 incorporated into the knob 28. The mode selector 29 can increase the number of possible states that can be conveyed by the rotary RFID switch. The mode selector 29 can comprise a plurality of RFID tags 37 in moveable relationship to an RF masking material such that only a single RFID tag 37 can be configured to be detectable. In a preferred embodiment, the mode selector 29 can comprise of two RFID tags representing two modes: 'A' and 'B', shown in FIG. 7 as 31 and 32, respectively. At any given time, exactly 2 RFID tags on the entire switch are detectable: 1 on the mode selector 29 and 1 on the internal switch base (hidden from view). In the case of an 8-position switch, a 2-position mode selector can give the user the means to select from one of 16 possible states, as shown on the two-mode label 26 and in FIG. 8. When the switch is slid to position 'B', the RFID tag 37 on the position 'A' side can be rendered detectable. The user can then select the desired position by turning the knob and pointing the indicator 27 to a position indicated by the outer concentric 'B' ring of custom label 26.

Optionally, switch base 1 can include a plurality of optional mounting appendages 4 to facilitate attachment to object being tracked. Additional features of mounting appendages may include holes for fasteners such as screws or bolts, adhesives, or magnets by which means the switch base 1 may be firmly attached to a ferromagnetic object such as steel.

In addition to the forgoing, the various embodiments of the present disclosure include, but are not limited to, the embodiments set forth in the following clauses.

Clause 1. A method, comprising: sending an excitation signal to a switch affixed to an object, the switch comprising a plurality of radio frequency identification (RFID) tags and a radio frequency (RF) masking material configured such that only one of the RFID tags is rendered detectable; associating each of the plurality of RFID tags of the switch with a defined object state; detecting the response of the single RFID tag rendered detectable by the switch; and interpreting the response of the single RFID tag rendered detectable by the switch, by which means a defined object state is conveyed.

Clause 2. A rotary radio frequency (RFID) switch, comprising: a first member comprising a disk-shaped metallic material onto which a plurality of radio frequency identification (RFID) tags are coupled such that their centerpoints are equidistant from the centerpoint of said member and equidistant from one another; second member comprising a disk-shaped metallic radio frequency (RF) masking material in rotational relationship around a common axis and flush against the first member; a plurality of identical indentations in the second member equal to one less than the number of RFID tags coupled to the first member, the shape and position of each said indentation sufficient to completely cover an RFID tag coupled to the first member when the second member is flush against the first member; a single cutout in the second member, the shape and position of said cutout sufficient to completely reveal an RFID tag coupled to the first member when the second member is flush against the first member; identical circular cams encircling the centerpoints of the first and second members such that when the members are continuously rotated with respect to one another, the members are alternately separated by some distance and then flush against one another, said distance being greater than the height of the RFID tags coupled to the first member.

Clause 3. The switch of clause 2, wherein the first member is comprised substantially of a non-metallic material.

Clause 4. The switch of clauses 2-3, wherein the second member is comprised substantially of a non-metallic material and coated with a radio frequency (RF) masking material.

Clause 5. The switch of clauses 2-4, wherein the first and second members are not disk-shaped.

Clause 6. A method, comprising: sending an excitation signal to a switch affixed to an object, the switch comprising a plurality of radio frequency identification (RFID) tags and a plurality of radio frequency (RF) masking materials configured such that only two of the RFID tags are rendered detectable; associating each combination of any two of the plurality of RFID tags of the switch with a defined object state; detecting the response of the two RFID tags rendered detectable by the switch; and interpreting the response of the two RFID tags rendered detectable by the switch, by which means a defined object state is conveyed.

Clause 7. The method of clause 6, wherein: the number of RFID tags capable of being rendered detectable by movement of the RF masking materials is any number between 2 and (N−1), where N is defined as the total number of RFID tags on the switch; associating every possible combination of the plurality of RFID tags of the switch with a defined state of the object; detecting the response of the plurality of RFID tags rendered detectable by the switch; and interpreting the response of the plurality of RFID tags rendered detectable by the switch, by which means a defined state of the object is conveyed.

Clause 8. The switch of clauses 6-7, further comprising a mode selector, comprising: a third member comprising a metallic substrate onto which a plurality of radio frequency (RFID) tags are coupled; a fourth member comprising a metallic radio frequency (RF) masking material in moveable relationship to the third member; a mechanism by which the fourth member can be moved with respect to the third member such that only a single RFID tag on the third member is rendered detectable.

Clause 9. The switch of clause 8, wherein the third member is comprised substantially of a non-metallic material.

Clause 10. The switch of clauses 8-9, wherein the fourth member is comprised substantially of a non-metallic material and coated with a radio frequency (RF) masking material.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims. In addition, all optional and preferred features and modifications of the described embodiments and dependent claims are usable in all aspects of the disclosure taught herein. Furthermore, the individual features of the dependent claims, as well as all optional and preferred features and modifications of the described embodiments are combinable and interchangeable with one another where applicable. To this end, the various embodiments described above disclose elements that can optionally be combined in a variety of ways depending on the desired implementation.

Therefore, at least the following is claimed:

1. A method, comprising:
    sending an excitation signal to a switch affixed to an object, the switch comprising a plurality of radio frequency identification (RFID) tags and a radio frequency (RF) masking material configured to mask a portion of the plurality of RFID tags, the switch being configured to render at least one of the plurality of RFID tags detectable by rotating at least a portion of the RF masking material over a plurality of raised indentations positioned on a base of the switch, each of the plurality of RFID tags of the switch being associated with a corresponding defined object state;
    detecting a response of the at least one detectable RFID tag; and
    interpreting the response of the at least one detectable RFID tag by determining the corresponding defined object state.

2. The method of claim 1, wherein the RF masking material comprises at least one cutout configured to render only one or two of the plurality of RFID tags detectable.

3. The method of claim 1, wherein a number of the plurality of RFID tags capable of being rendered detectable by movement of the RF masking material is between 2 and (N−1), where N is defined as a total number of the plurality of RFID tags on the switch.

4. The method of claim 3, further comprising associating a combination of the plurality of RFID tags of the switch with a respective defined state of the object.

5. The method of claim 4, further comprising detecting the response of the combination of the plurality of RFID tags rendered detectable by the switch.

6. The method of claim 5, further comprising interpreting the response of the combination of the plurality of RFID tags rendered detectable by determining the respective defined state of the object associated with the combination of the plurality of RFID tags.

7. The method of claim 1, wherein the plurality of raised indentations comprises a first plurality of raised indentions for the base, and the RF masking material comprising a second plurality of raised indentions that contact the first plurality of raised indentions.

8. The method of claim 7, wherein at least one of the first plurality of raised indentions fit within at least one of the second plurality of raised indentions.

9. A rotary radio frequency identification (RFID) switch, comprising:
    a first member comprising a disk-shaped base onto which a plurality of radio frequency identification (RFID) tags are coupled such that their centerpoints are equidistant from adjacent RFID tags;
    a second member comprising a disk-shaped radio frequency (RF) masking material, the second member being in rotational relationship around a common axis and flush against the first member, the common axis extending through the first member and the second member;
    a plurality of indentations in the second member, a number of the indentations in the second member being at least one less than a number of the plurality of RFID tags coupled to the first member, the plurality of indentations being configured to cover a portion of the plurality of RFID tags when the second member is flush against the first member;
    a cutout in the second member, the cutout being configured to reveal at least one of the plurality of RFID tags coupled to the first member when the second member is flush against the first member; and
    wherein the first member and the second member are configured to rotate about the common axis, the first member and the second member being configurable to be separated by a distance when rotated, the distance being greater than a height of the plurality of RFID tags.

10. The rotary RFID switch of claim 9, wherein the plurality of RFID tags are coupled to the first member such that the centerpoints of the plurality of RFID tags are equidistant from a centerpoint of the first member.

11. The rotary RFID switch of claim 9, wherein the cutout is configured in a shape of a corresponding one of the plurality of RFID tags to completely reveal the at least one of the plurality of RFID tags coupled to the first member when the second member is flush against the first member.

12. The rotary RFID switch of claim 9, wherein the first member and the second member are substantially equal in diameter.

13. The rotary RFID switch of claim 9, wherein the first member is comprised substantially of a non-metallic material.

14. The rotary RFID switch of claim 9, wherein the second member is comprised substantially of a non-metallic material and coated with a radio frequency (RF) masking material.

15. The rotary RFID switch of claim 9, wherein the plurality of RFID tags comprises a first plurality of RFID tags, and further comprising a mode selector, comprising:
   a third member comprising a metallic substrate onto which a second plurality of RFID tags are coupled;
   a fourth member comprising a metallic radio frequency (RF) masking material in moveable relationship to the third member; and
   a mechanism by which the fourth member can be moved with respect to the third member such that one of the second plurality of RFID tags on the third member is rendered detectable.

16. The rotary RFID switch of claim 15, wherein the third member is comprised substantially of a non-metallic material.

17. The rotary RFID switch of claim 15, wherein the fourth member is comprised substantially of a non-metallic material and coated with a radio frequency (RF) masking material.

\* \* \* \* \*